Sept. 1, 1970     C. G. WYNNE     3,526,447

OPTICAL SYSTEMS

Filed June 15, 1966     2 Sheets-Sheet 1

INVENTOR
Charles Gorrie Wynne
BY
Lawrence E. Laubscher
ATTORNEY

Charles Gorrie Wynne
INVENTOR

BY
Lawrence E. Laubscher
ATTORNEY

United States Patent Office 3,526,447
Patented Sept. 1, 1970

3,526,447
OPTICAL SYSTEMS
Charles Gorrie Wynne, Beckenham, England, assignor to Specto Avionics Limited
Filed June 15, 1966, Ser. No. 557,832
Claims priority, application Great Britain, June 16, 1965, 25,435/65
Int. Cl. G02b 27/14
U.S. Cl. 350—174                 1 Claim

ABSTRACT OF THE DISCLOSURE

A head-up display unit for projecting a collimated image of a cathode-ray-tube display onto an inclined partly-transparent reflector in the line of sight of an aircraft-pilot, use being made of a prism for displacing the optical axis through a right angle. The prism is part of a collimating system that consists, in succession from the cathode-ray tube to the reflector, of a diverging lens, a converging lens, the prism, a converging lens doublet and a further converging lens.

---

Figure 1:
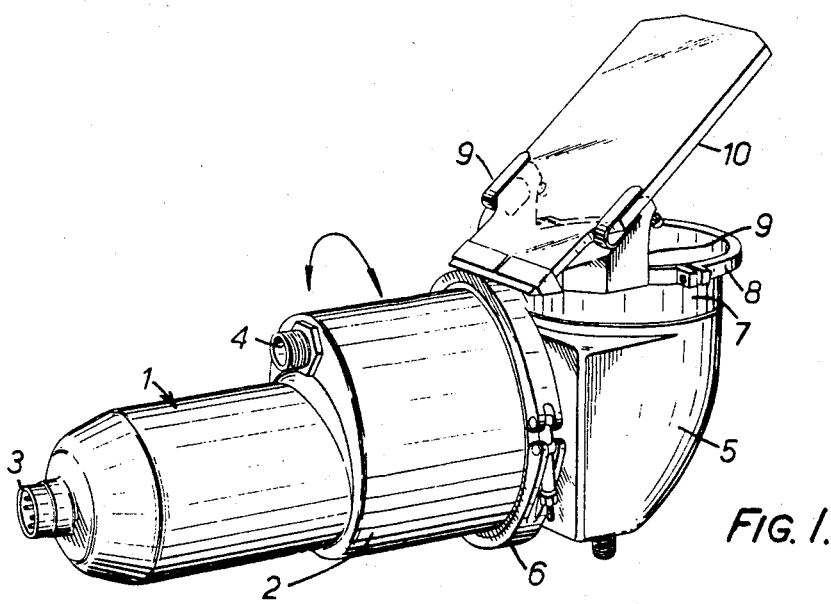

In a form of navigational instrument, particularly suitable for use in aircraft and sometimes referred to as a head-up display, navigational and other information is displayed upon the screen of a cathode ray tube and an image on the screen of the tube is presented to the pilot of the aircraft, the image appearing at infinity and in the normal line of sight. The optical system used for this purpose will include a reflector plate in the line of sight of the pilot, and a lens system for producing the desired image at infinity. For purely practical reasons, it is generally desirable that the longitudinal axis of the cathode ray tube should be generally parallel to the line of sight of the pilot and so the optical system will usually comprise also a 45° prism.

In an optical system for use in navigational display means of this kind it is desirable that the lens should have as large an aperture as possible, in order to give a bright image to the pilot and it is also desirable that the angle of view should be large, so as to enable the pilot to see the image over a relatively large range, without having to position himself too accurately on the optical axes of the system.

The present invention is concerned with a design of optical system, suitable for this purpose, and provides display apparatus for displaying information within the field of view of an observer, comprising display device for forming a visible display of said information at a surface and an optical system for directing light from said surface a collimated beam forming a virtual image of said display at infinity in the field of view of the observer, said optical system including a collimating lens system which comprises in the order given and starting from the lens nearest display device, a diverging lens element, a first converging lens element, a converging lens element, a converging lens doublet, and a second converging lens element. The invention also provides display apparatus for displaying information within the field of view of an observer viewing a distant scene, comprising a display device for providing a display of said information, and an optical system for forming a virtual image of said display at infinity, visible within the field of view of the observer when viewing said scene through the partially-transparent reflector, said optical system including a partially-transparent reflector, and a collimating lens system that is interposed between said display device and said partially-transparent reflector for collimating light from said display device, said collimating lens system comprising, in the order given and in the sense from the display device toward said partially-transparent reflector, a diverging lens element, a first converging lens element, a converging lens doublet, and a second converging lens element.

Figure 2:
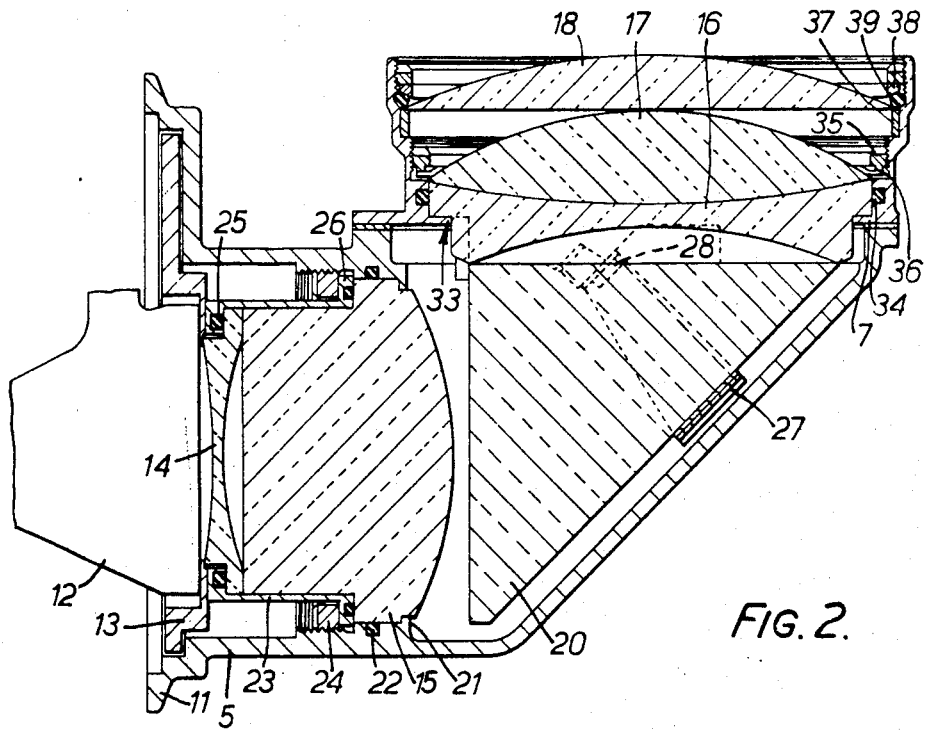
Figure 3:
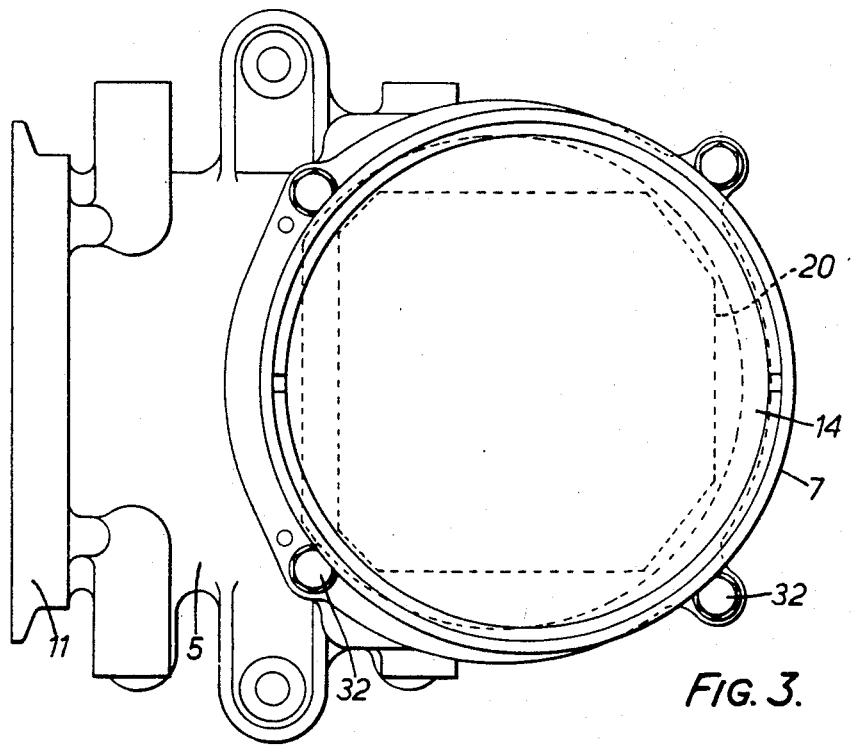
Figure 4:
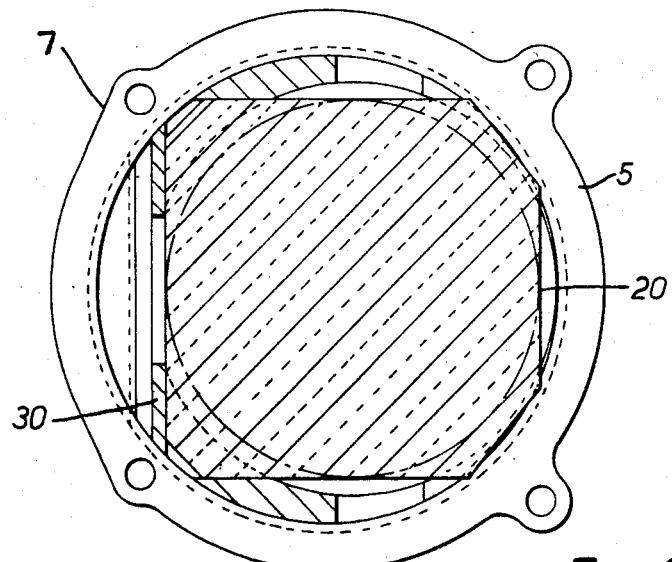

Other features and advantages of the invention will appear from the following description of an embodiment thereof, given by way of example in conjunction with the accompanying drawings, in which:

FIG. 1 is a perspective view of a head-up display unit for mounting in an aircraft;
FIG. 2 is a vertical sectional view through the lens unit of the optical system;
FIG. 3 is a plan view of the same lens unit; and
FIG. 4 is a plan view with the cover removed, showing the means for mounting the prism.

Referring to FIG. 1 the head-up display unit comprises a main housing 1, conveniently of spun metal, which houses a cathode ray tube. The housing 1 is enlarged at 2, and electrical sockets 3 and 4 are provided for connecting the cathode ray tube to a source of display signals and operating voltages. At its forward end, the main housing 1 is connected to a housing 5 for part of the lens unit which can conveniently be a die-casting, the two housings being joined by a clamping ring 6. The two parts 1 and 5 can be rotated about the axis of the housing 1, and clamped in position by fixing screws (not shown) passing through mating flanges on the two parts. On top of the housing 5 is secured a mounting 7 for the remainder of the lens unit. A clamping ring 8 embraces the top of the mounting 7, and has arms 9 extending upwardly from it, which carry a half-silvered mirror 10.

As shown in FIG. 2, the housing 5 has a mounting flange 11, against which is located the screen of the cathode ray tube 12, with an interposed insulator 13. The housing accommodates five lens elements, which can be identified as the first, second, third, fourth and fifth elements having reference numerals 14, 15, 16, 17 and 18 respectively; between the second and third elements is a right prism 20. The second eleemnt 15 is ground to fit against a mounting flange 21, with a sealing O-ring 22, lodged in a recess in the housing, between this element and the housing. The first element 14 fits against the rear face of element 15 and is held by means of a lens sleeve 23. The sleeve is held in the body by means of a screwed ring 24 and sealing O-rings 25 and 26 are accommodated in recess in the sleeve as shown.

The prism 20 is held in the housing by means of a strap 27, held to the body of the housing by belts as at 28. The rear face of the prism engages an abutment 30 (FIG. 4) and there is a lateral clearance to afford a small degree of sideways clearance for the prism on assembly.

As shown in FIG. 3, the third, fourth and fifth lens elements are carried in the separate lens mounting 31 which is held to the main housing by bolts 32. Shims, which can be inserted or removed as necessary are interposed between the adjacent faces of the housing and the lens mounting. The third element 16 of the lens system seats on a shoulder 33 in the lens mounting 5, and is sealed by an O-ring 34. The fourth element 17 has a surface contacting the surface of the third element, and the two elements are held by a screwed ring 35 with an interposed anti-chafing ring 36. The fifth element 17 of the system is also mounted in the lens mounting 7 and is located with respect to the fourth element by means of a spacer ring 37, and held by screwed ring 38 with interposed sealing ring 39. On assembly, the spacing ring 37 can be ground to size as required.

In one practical form of the invention, providing an f/0.97 collimator, of 4 inches focal length, and providing a field of 12½° each side of the axis, the lens recipe given in the following table were used. In this table the refractive indices $n_d$ were measured at the wavelength of the Helium "d" spectographic line ($5876 \times 10^{-10}$ metres). The reciprocal dispersive powers (or constringences) V are given by the equation:

$$V = (\eta_d - 1)/(\eta_F - \eta_C)$$

wherein $\eta_F$ and $\eta_C$ are the refractive indices measured respectively at the wavelength of the Hydrogen F line ($4861 \times 10^{-10}$ metres) and the Hydrogen C Line ($6563 \times 10^{-10}$ metres). The spacings $u$, $v$, $w$, $x$ and $y$ are the spacings between adjacent surfaces of respectively the cathode ray tube and the first lens, the first and second lenses, the second lens and the prism, the prism and the third lens, and the fourth and fifth lenses.

| Element | Radius of curvature of adjacent surfaces in inches | Axis thickness or separation in inches | $\eta_d$ | V | Clear diameter in inches |
|---|---|---|---|---|---|
| C.r.t. display face 12. | Infinite | | | | |
| | | 0.1000 | 1.6220 | | Effective 1.76 |
| | Infinite | | | | |
| Spacing $u$ | | 0.1167 | Air | | 1.76 |
| Diverging lens 14. | 7.6994 | | | | |
| | | 0.1103 | 1.5190 | 60.4 | 1.88 |
| | −2.8030 | | | | |
| Spacing $v$ | | 0.1500 | Air | | 1.88 |
| Converging lens 15. | −27.078 | | | | |
| | | 1.7791 | 1.7440 | 44.7 | 2.67 |
| | 2.8321 | | | | |
| Spacing $w$ | | 0.1467 | Air | | Square |
| | Infinite | | | | 3.10 x 3.10 |
| Prism 20 | | 3.1000 | 1.6200 | 36.2 | |
| | Infinite | | | | 3.10 |
| Spacing $x$ | | 0.3000 | Air | | |
| Converging lens 16. | 4.1338 | | | | 3.65 |
| | | 0.2000 | 1.7484 | 27.8 | |
| | −9.3284 | | | | 3.65 |
| Doublet 17 | | 0.7511 | 1.6510 | 58.6 | |
| | 3.4492 | | | | |
| Spacing $y$ | | 0.0029 | Air | | 4.00 |
| Converging lens 18. | −264.55 | | | | 4.00 |
| | | 0.4830 | 1.6910 | 54.8 | |
| | 5.1070 | | | | |

The collimating lens system as used in a head-up display is required to give collimation with minimum distortion together with a maximum field angle consistent with a practical weight and size of lens system. The exit pupil is also required to be as large as possible to accommodate for movement of the observer's head, but this conflicts with the requirement for low weight and small size. Thus, the lens system is required to have a relatively large aperture with a large field angle for a system of this aperture, and this together with a high degree of correction for aberrations and an acceptable weight and size.

The lens system described above is found in practice to provide a collimated beam having very little distortion through the field angle of ±12.5 degrees with respect to the optical axis. A measure of the distortion at any point across the collimated beam produced at any angle within this range, can be obtained by determining the angular deviation from this angle of the light path through that point. With the present lens system, the angular deviation or error within the useful part of the display does not exceed ±1 milliradian. The actual maximum angular deviations at beam angles of 0.±5, ±7, ±10, and ±12.5 degrees are respectively ±0.25, ±0.5, ±0.8, ±1.0 and ±2.0 milliradians; in the latter case, however, the maximum deviation occurs only outside the normal viewing field, the maximum within the field being ±1.0 milliradian.

I claim:
1. In a display apparatus for displaying information in the line of sight of an observer, the invention which comprises, in combination:
   display means including a cathode ray tube with a planar face ground to optical standards;
   collimating means focussed on said planar face for forming a virtual image of said display at infinity, said collimating means including, in optical succession from said planar face, diverging lens means including a double concave lens, a first converging lens element, prism means for displacing the optical axis through a substantial angle, a converging lens doublet, and a second converging lens element; and
   reflector means including a semi-transparent reflector inclined to the optical axis of said second converging lens element for intercepting light from said collimating system and for superimposing said virtual image on the observer's view of a distant scene.

References Cited

UNITED STATES PATENTS

| | | | |
|---|---|---|---|
| 2,434,109 | 1/1948 | Harasta | 88—2.4 |
| 2,453,122 | 11/1948 | Ensinger | 88—2.3 |
| 2,467,831 | 4/1949 | Johnson | 33—49 |
| 2,957,384 | 10/1960 | Raninen. | |
| 3,137,769 | 6/1964 | Yates et al. | 178—6.8 |
| 3,339,203 | 8/1967 | Curry et al. | |
| 3,182,576 | 5/1965 | Papke | 350—203 X |

FOREIGN PATENTS 757,362   4/1967   Canada.

RONALD L. WIBERT, Primary Examiner

T. MAJOR, Assistant Examiner

U.S. Cl. X.R.

350—203, 220